(12) United States Patent
Hara (10) Patent No.: US 7,301,763 B2
(45) Date of Patent: Nov. 27, 2007

(54) ELECTRONIC DEVICE

(75) Inventor: Takuya Hara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/516,367

(22) Filed: Sep. 6, 2006

(65) Prior Publication Data

US 2007/0120999 A1    May 31, 2007

(30) Foreign Application Priority Data

Sep. 6, 2005    (JP)    ............................ P2005-257271

(51) Int. Cl.
*H05K 7/20* (2006.01)
(52) U.S. Cl. .................. 361/687; 165/104.33; 348/373
(58) Field of Classification Search ........... 165/104.33, 165/80.4; 348/372, 373, 333.01, 333.08; 62/259.2; 361/697, 700, 679–687, 724–727
See application file for complete search history.

(56) References Cited

U.S. PATENT DOCUMENTS 7,156,160 B2 * 1/2007 Lee et al. .............. 165/104.33

2004/0118143 A1 * 6/2004 Bash et al. ................. 62/259.2
2006/0039111 A1 * 2/2006 Huang ......................... 361/698
2007/0074855 A1 * 4/2007 He et al. ............... 165/104.33

FOREIGN PATENT DOCUMENTS

JP    08-235846 A    9/1996
JP    2001-035062 A    2/2001

* cited by examiner

*Primary Examiner*—Hung Van Duong
(74) *Attorney, Agent, or Firm*—Lerner, David, Littenberg, Krumholz & Mentlik, LLP (57) ABSTRACT

An electronic device includes a chamber having a chamber wall surface defining a liquid-tight sealed space; an electronic unit housed in a liquid-tight case, the case being disposed in the chamber to define an intermediate space between the case and the chamber wall surface; a biasing unit in the chamber that biases the case toward a predetermined neutral position in the intermediate space; a liquid disposed in the intermediate space; and an iris system formed in the chamber such that when the case moves toward a portion of the chamber wall surface, the iris system cooperates with the case to define a flow path through which the liquid in a portion of the intermediate space between the case and the portion of the chamber wall surface flows to another portion of the intermediate space, a cross-sectional area of the flow path decreasing as the case moves closer to the portion of the chamber wall surface.

8 Claims, 5 Drawing Sheets

FIG. 5

ELECTRONIC DEVICE

CROSS-REFERENCE TO RELATED APPLICATIONS

The present application claims priority from Japanese Patent Application No. JP 2005-257271 filed on Sep. 6, 2005, the disclosure of which is hereby incorporated by reference herein.

BACKGROUND OF THE INVENTION

1. Field of the Invention

The present invention relates to electronic devices.

2. Description of the Related Art

Electronic units such as hard disk drives are often susceptible to impact, and it easily causes problems. There thus needs to reduce the impact for the electronic units especially in electronic devices equipped with such electronic units.

The electronic devices are exemplified by a music player that records and/or reproduces music information to/from the hard disk drive, an imaging device that records and/or reproduces image information to/from the hard disk drive, or others.

For the aim of impact reduction, a first previous technology proposes that a hard disk drive between two types of liquid is let float, and kept hold of the hard disk drive thereby. That is, the hard disk drive is disposed in a chamber provided inside of a cabinet of an electronic device, and a space is formed between the outer surface of a case of the hard disk drive and the inner surface of the chamber. The space is then filled with two types of liquid, each having a different specific gravity and thus being immiscible. For more details, refer to JP-A-8-235846.

With the first previous technology, the impact applied to the electronic device is spread between the two types of liquid so that the impact is reduced before being transmitted to the hard disk drive.

For the aim of impact reduction, there is also a second previous technology, proposing that a hard disk drive is housed in a chamber provided inside of a cabinet of an electronic device, a gel-like viscous fluid is filled to a space between the outer surface of a case of the hard disk drive and the inner surface of the chamber, and the case is kept hold using an elastic member provided to the inner surface of the chamber. For more details, refer to JP-A-2001-35062.

With the second previous technology, the impact applied to the electronic device is absorbed by the viscous fluid, and the space portion formed between the outer surface of the case and the inner surface of the chamber serves as an orifice so that the viscous fluid is made to serve as a damper when moves.

With the first previous technology, however, there needs to make settings of specific gravity for two types of liquid and for the hard disk drive in such a manner that the hard disk drive floats between the two types of liquid each having a different specific gravity. This considerably restricts the design flexibility not only by a difficulty in selecting such two types of liquid but also by a burden of adjusting the specific gravity of the hard disk drive. There is thus a problem of the technology not being practical enough. Moreover, the impact absorption by the liquid seems not enough.

As to the second previous technology, although it is more practical than the first previous technology, the impact absorption by the viscous fluid seems not enough either as that by the liquid. The second previous technology indeed gives a description of making the viscous fluid serve as a damper when the fluid moves, however, there is no description about how to configure the orifice to derive the sufficient impact absorption.

It is thus desirable to provide an electronic device that advantageously serves well for impact reduction with effect.

SUMMARY OF THE INVENTION

According to an embodiment of the present invention, there is provided an electronic device including a chamber having a chamber wall surface defining a liquid tight sealed space; an electronic unit housed in a liquid-tight case, the case being disposed in the chamber to define an intermediate space between the case and the chamber wall surface; a biasing unit in the chamber that biases the case toward a predetermined neutral position in the intermediate space; a liquid disposed in the intermediate space; and an iris system formed in the chamber such that, when the case moves toward a portion of the chamber wall surface, the iris system cooperates with the case to define a flow path through which the liquid in a portion of the intermediate space between the case and the portion of the chamber wall surface flows to another portion of the intermediate space, a cross-sectional area of the flow path decreasing as the case moves closer to the portion of the chamber wall surface.

According to the embodiment of the invention, the cross-sectional area of the flow path is changed depending on the magnitude of an impact force so that the flow path resistance can be changed in magnitude. This is advantageous to reduce, to a sufficient degree, the impact force irrespective of the magnitude.

DETAILED DESCRIPTION

By referring to the accompanying drawings, described next is an embodiment of the invention.

Figure 4A:
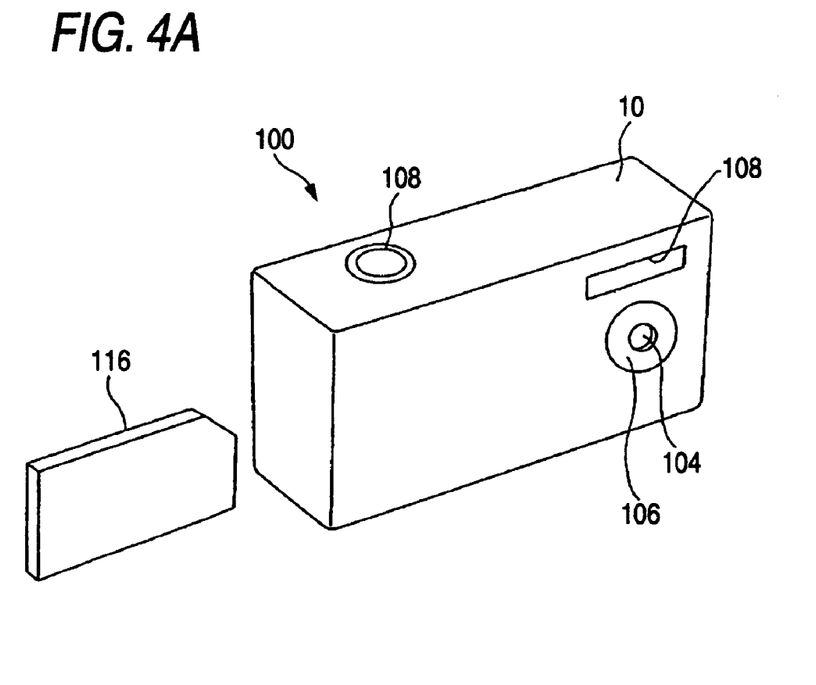
FIGS. 4A and 4B both are perspective views of the electronic device 100.
Figure 4B:
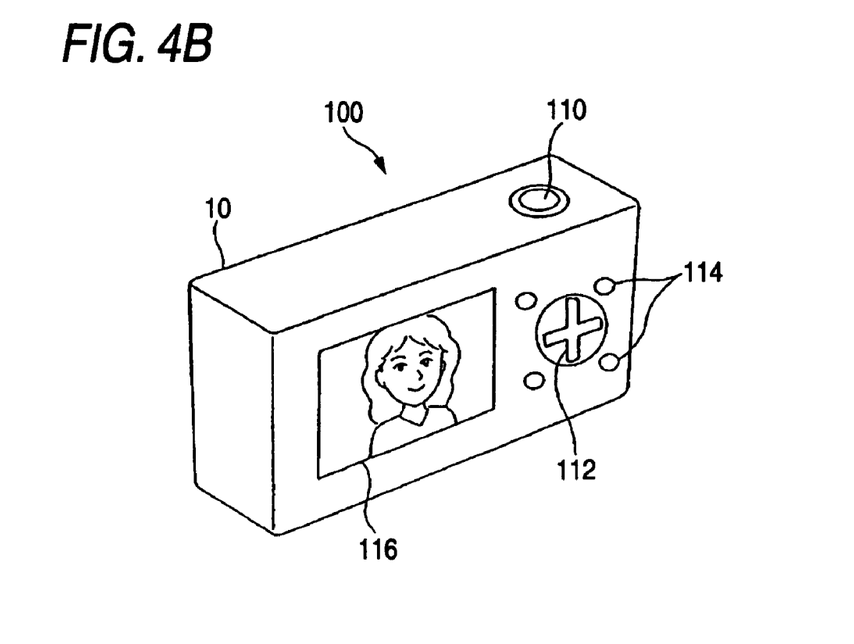
Figure 5:
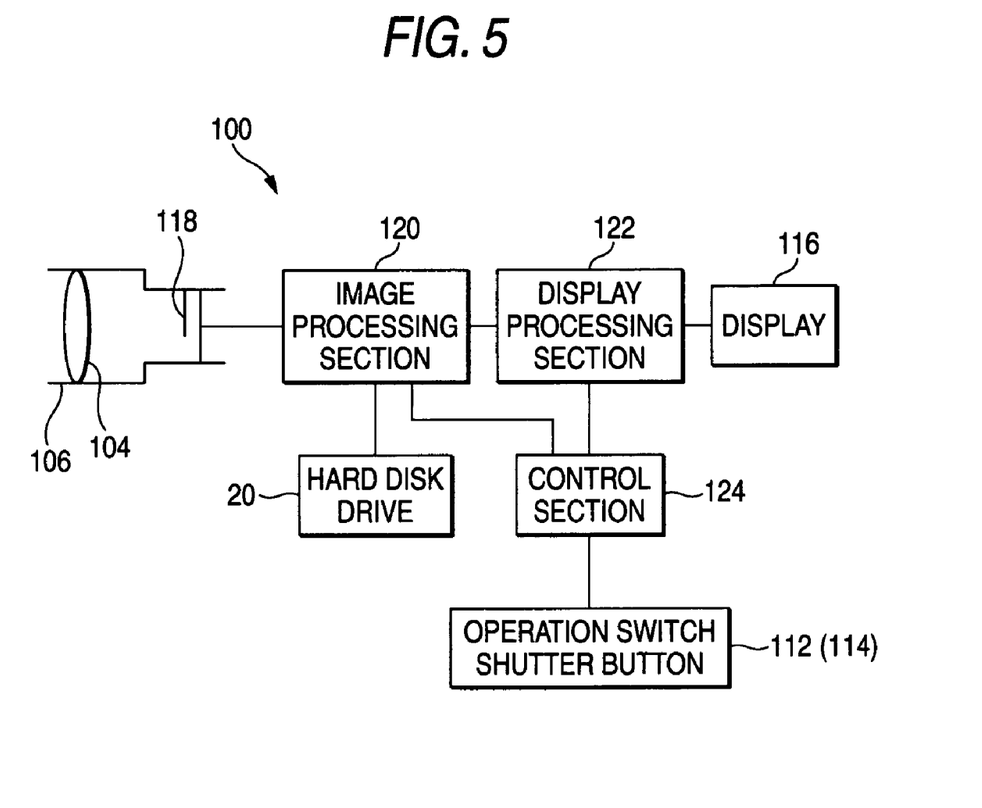
FIG. 5 is a block diagram showing the configuration of the electronic device 100.

FIGS. 4A and 4B both are perspective views of an electronic device 100, and FIG. 5 is a block diagram showing the configuration of the electronic device 100.

As shown in FIGS. 4A and 4B, in this embodiment, the electronic device 100 is an imaging device exemplified by a digital still camera, and is equipped with a hard disk drive 50 (refer to FIG. 5) serving as an electronic unit.

The electronic device 100 includes a cabinet 10 that configures an outer sheath.

The cabinet 10 is provided with, on its front right hand side, a lens barrel 106 for keeping hold of an optical system 104 therein.

The lens barrel 106 of the cabinet 10 is provided with, on its upper portion, a flash section 108 or others for flashing light.

The cabinet 10 is provided with, on its upper end surface, a shutter button 110.

The rear surface of the cabinet 10 carries thereon with a plurality of operation switches 112 and 114 for various types of operations, e.g., turning power on/off, and switching between an imaging mode and a reproduction mode, for example. A display 116 is also provided thereon for displaying any captured images.

As shown in FIG. 5, the lens barrel 106 is provided with, at its rear portion, an imaging element 118 configured by a CCD (Charge-Coupled Device), a CMOS (Complementary Metal-Oxide Semiconductor) sensor, or others for capturing the image of an object formed by the optical system 104. The imaging device 100 is configured to include an image processing section 120, a display processing section 122, a control section 126, or others. The image processing section 120 generates image data based on an image capture signal coming from the imaging element 118, and the display processing section 122 displays the image data on the display 116. The control section 126 includes a CPU (Central Processing Unit) and others that control the components, e.g., the image processing section 120, the display processing section 122, and the hard disk drive 50, in response to the operation to the operation switches 112 and 114 and the shutter button 110.

Through control of the image processing section 120 and the hard disk drive 50, the control section 126 records the image data generated in the image processing section 120 to the hard disk drive 50, and reads the image data recorded in the hard disk drive 50 to supply the image data to the image processing section 120. The control section 126 supplies the image data from the image processing section 120 to the display processing section 122 so as for the display 116 to display thereon the image data.

The configuration of the electronic device 100 is described next in detail.

Figure 1:
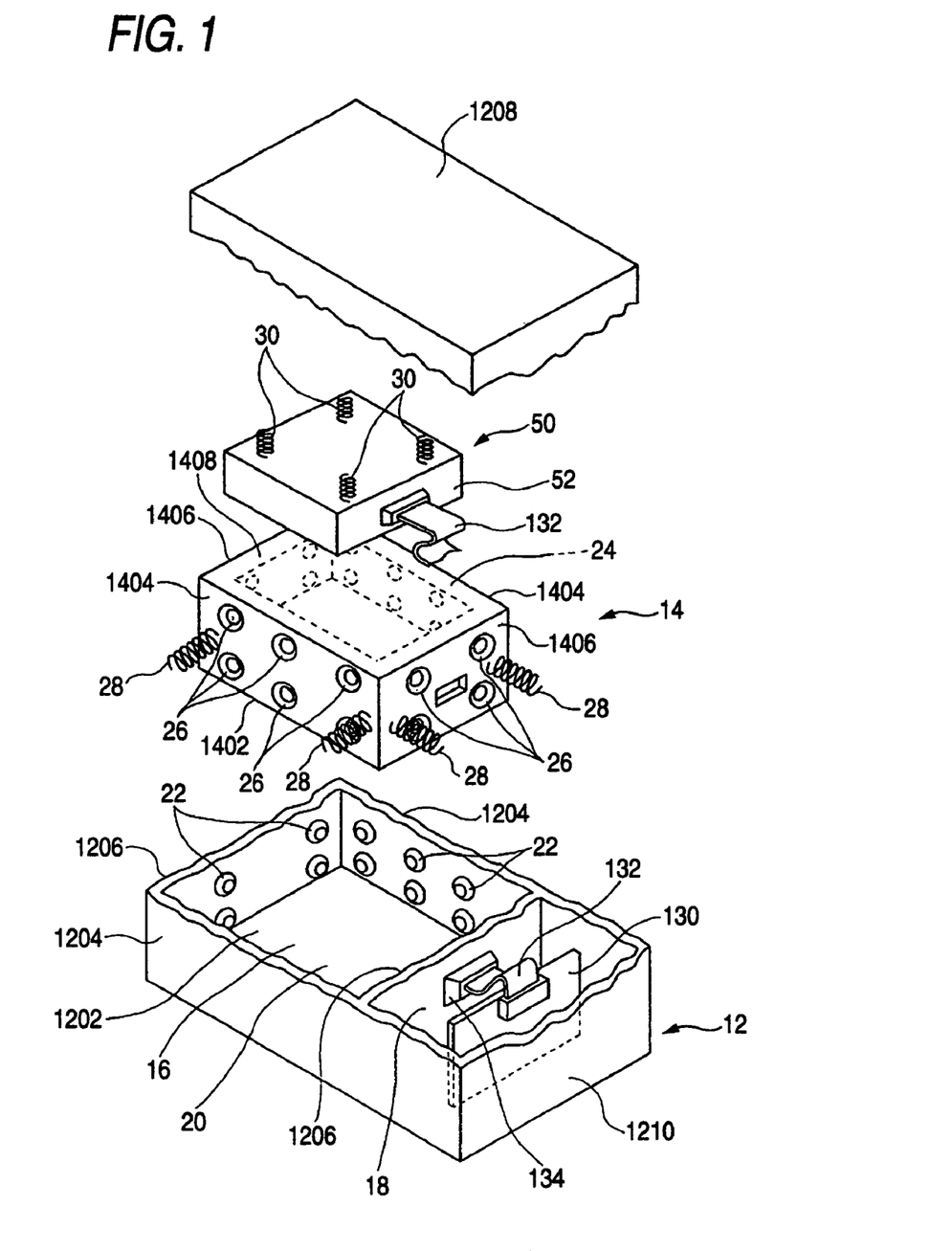
FIG. 1 is an exploded perspective view showing the internal configuration of an electronic device 100 of an embodiment.

FIG. 1 is an exploded perspective view showing the internal configuration of the electronic device 100 of this embodiment.

Figure 2A:
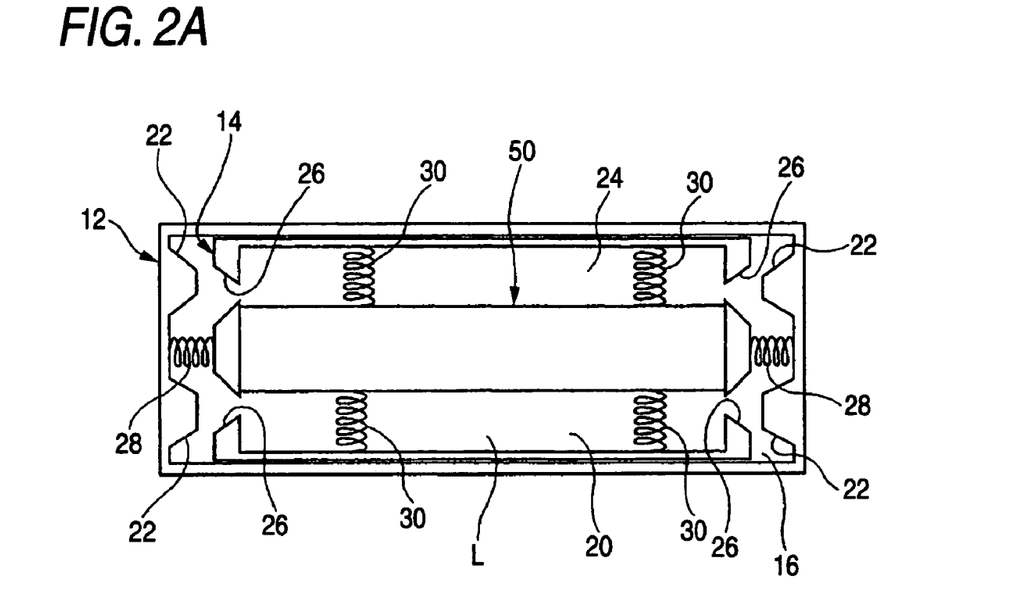
FIG. 2A is a diagram for illustrating a hard disk drive 50 being disposed at a predetermined neutral position of a chamber 16.
Figure 2B:
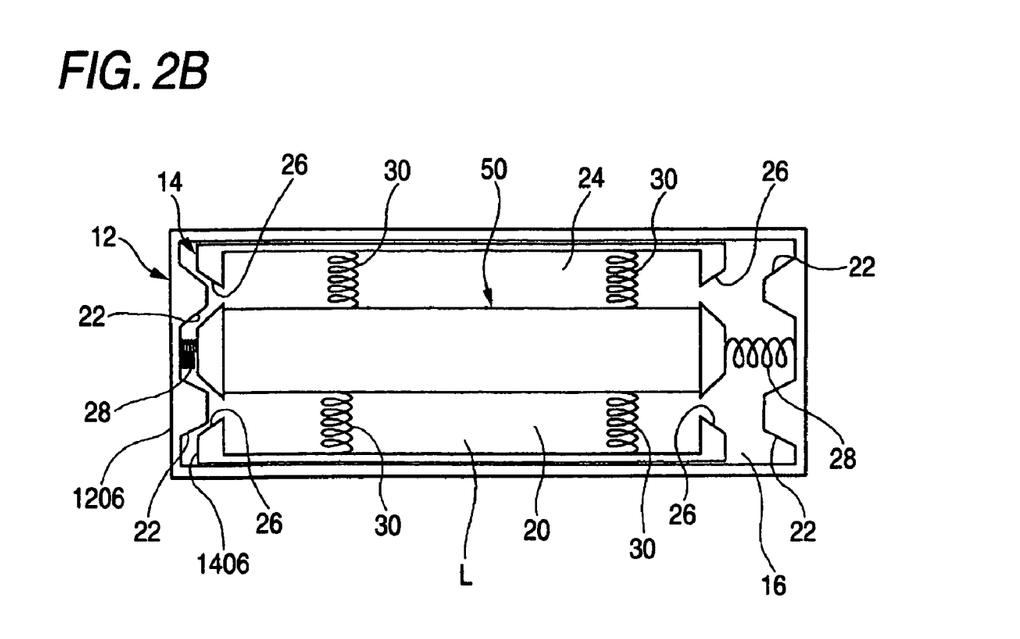
FIG. 2B is a diagram for illustrating the hard disk drive after moved in one length direction due to impact application.

FIG. 2A is a diagram for illustrating the hard disk drive 50 being disposed at a predetermined neutral position of a chamber 16, and FIG. 2B is a diagram for illustrating the hard disk drive after moved in one length direction due to impact application.

Figure 3A:
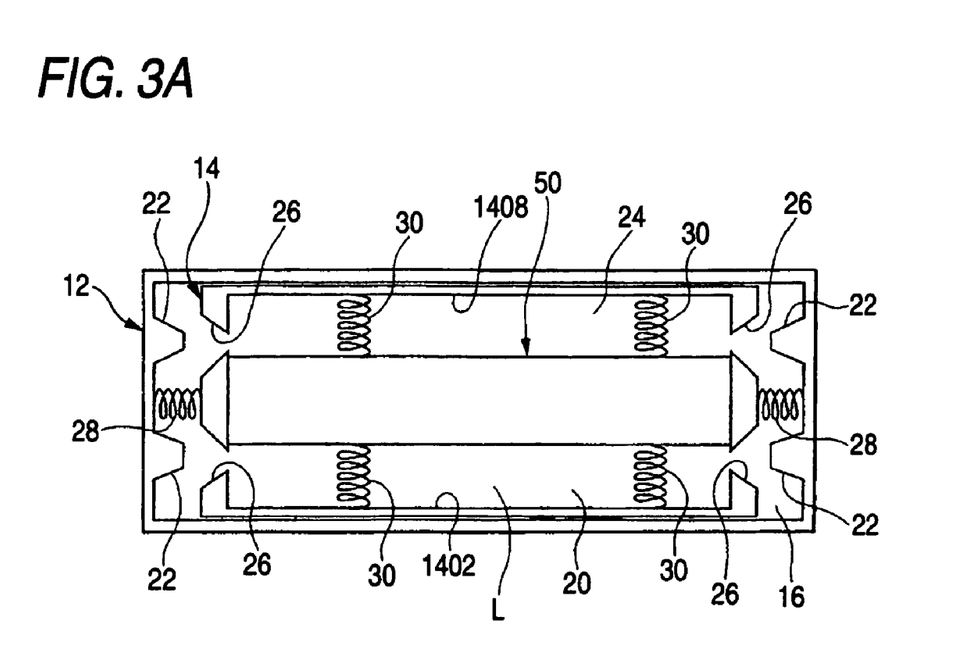
FIG. 3A is another diagram for illustrating the hard disk drive 50 being disposed at the predetermined neutral position of the chamber 16.
Figure 3B:
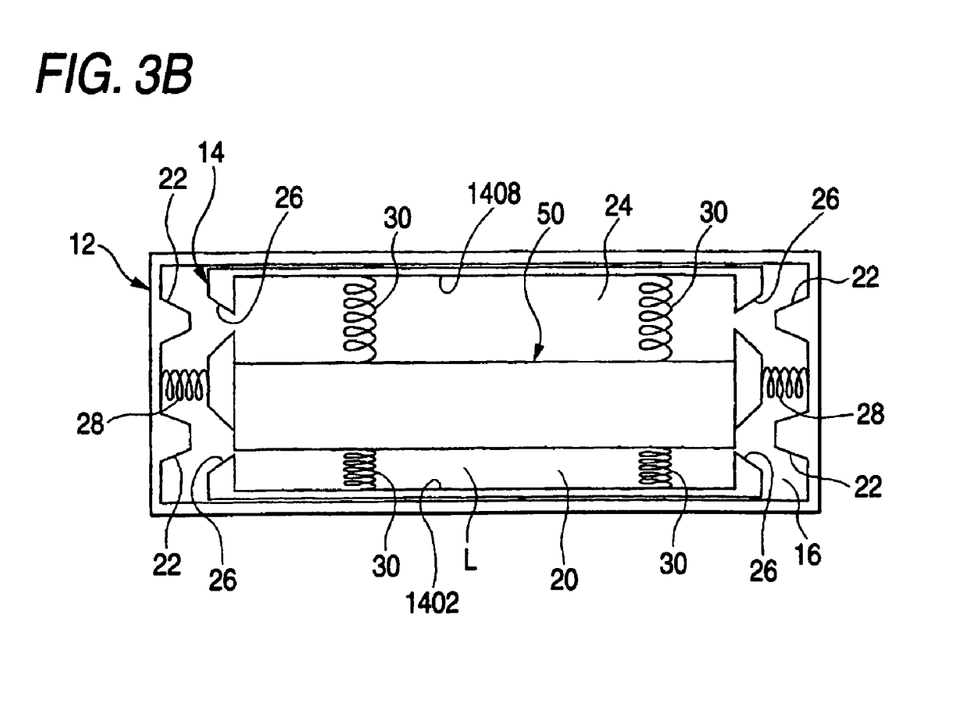
FIG. 3B is a diagram for illustrating the hard disk drive after moved in one thickness direction due to impact application.

FIG. 3A is another diagram for illustrating the hard disk drive 50 being disposed at the predetermined neutral position of the chamber 16, and FIG. 3B is a diagram for illustrating the hard disk drive after moved in one thickness direction due to impact application.

As shown in FIG. 1, the cabinet 10 of the electronic device 100 carries therein an outer case 12, the outer case 12 carries therein an in-between case 14, and the in-between case 14 carries therein the hard disk drive 50.

The hard disk drive 50 is biased toward a neutral position inside of the outer case 12 by a biasing unit, i.e., coil springs 28 and 30, and a liquid L is filled inside of the outer case 12.

The liquid L is exemplified by water or silicon oil.

The hard disk drive 50 is provided with a liquid-tight case 52, and components configuring the hard disk drive 50 are housed in the case 52.

The case 52 is shaped flat rectangular, in which the width is larger than the thickness, and the length is larger than the width.

The outer case 12 is formed rectangular, and carries therein the hard disk drive chamber 16 to accommodate therein the in-between case 14, and a print substrate chamber 18.

The chamber 16 has a rectangular-shaped bottom wall 1202, two longer side walls 1204, two shorter side walls 1206, and an upper wall 1208. The longer side walls 1204 are standing upright from two longer sides of the bottom wall 1202, and the shorter side walls 1206 are standing upright from two shorter sides of the bottom wall 1202. The upper wall 1208 connects together the upper ends of the longer side walls 1204 and the shorter side walls 1206. By these chamber wall surfaces, the chamber 16 is formed as a liquid-tight sealed space 20.

As such, the sealed space 20 is formed by the bottom wall 1202, the two longer side walls 1204, the two shorter side walls 1206, and the upper wall 1208. The shape of the sealed space 20 is rectangular in which the width is larger than the thickness, and the length is larger than the width.

As shown in FIGS. 2A and 2B, the two longer side walls 1204 and the two shorter side walls 1206 are each provided with a plurality of iris sections 22 facing in the width and length directions of the in-between case 14, and the iris sections 22 form, when the in-between case 14 comes closer, an iris diaphragm together with a portion of the in-between case 14.

In this embodiment, the iris sections 22 are each formed as a convex portion formed like a truncated cone.

The in-between case 14 is shaped rectangular, and includes a chamber 24 to carry therein the hard disk drive 50.

In this embodiment, the sealed space 20 is configured by the inner portion of the chamber 16, and the chamber 24 of the in-between case 14.

The in-between case 14 has a rectangular-shaped bottom wall 1402, two longer side walls 1404, two shorter side walls 1406, and an upper wall 1410. The longer side walls 1404 are standing upright from two longer sides of the bottom wall 1402, and the shorter side walls 1406 are standing upright from two shorter sides of the bottom wall 1402. The upper wall 1410 connects together the upper ends of the longer side walls 1404 and the shorter side walls 1406.

As such, the chamber 24 of the in-between case 14 is formed by the bottom wall 1402, the two longer side walls 1404, the two shorter side walls 1406, and the upper wall 1410. The shape of the chamber 24 is rectangular in which the width is larger than the thickness, and the length is larger than the width.

The in-between case 14 is disposed in the chamber 16 not to be able to move in the thickness direction, and to be able to move in the width and length directions.

As shown in FIGS. 3A and 3B, the two longer side walls 1404 and the two shorter side walls. 1406 are formed with, at portions corresponding to the iris sections 22, a plurality of holes 26. The inner surfaces of the holes 26 are coaxial with the iris sections 22, and are each formed by a conical surface of a size enough to house therein the corresponding iris section 22.

These holes 26 form, when the in-between case 14 moves in the width and length directions from a neutral position, a flow path together with the iris sections 22 to let escape the liquid L resting at a portion of the sealed space 20 sandwiched between the in-between case 14 and the chamber wall surface to any other portion of the sealed space 20, and reduces the cross sectional area of the flow path as the in-between case 14 moves close to the chamber wall surface. As such, the holes 26 form a so-called iris diaphragm.

Between the longer side walls 1204 and the longer side walls 1404, and between the shorter side walls 1206 and the shorter side walls 1406, the coil spring 28 is each disposed to bias the in-between case 14 toward the neutral position in the width and length directions in the chamber 16. In this embodiment, the neutral position of the case 52 is the center position in the width and length directions in the chamber 16.

The case 52 of the disk drive 50 is disposed in the in-between case 14 to be able to move in the thickness direction, and not to be able to move in the width and length directions.

Between the bottom wall 1402 and the case 52, and between the upper wall 1408 and the upper surface of the case 52, the coil spring 30 is each disposed to bias the case 52 toward the neutral position in the thickness direction in the chamber 24. In this embodiment, the neutral position of the case 52 is the center position in the thickness direction in the chamber 16.

In this embodiment, the coil springs 28 and 30 configure a biasing unit that biases the case 52 toward the neutral position.

In this embodiment, when the case 52 moves from a neutral position in the thickness direction, the holes 26 form a flow path together with the case 52 to let escape the liquid L resting at a portion of the sealed space 20 sandwiched between the case 52 and the side wall (chamber wall surface) of the in-between case 14 to any other portion of the sealed space 20, and reduces the cross sectional area of the flow path as the case 52 moves onto the holes 26. As such, the holes 26 form a so-called iris diaphragm.

Note here that the print substrate chamber 18 includes a portion of the bottom surface 1202 that is extending from one shorter side toward one length direction, an extending portion of each of the longer side walls 1204, a side wall 1210 opposite to the shorter side wall 1206, and an extending portion of the upper wall 1208.

The print substrate chamber 18 carries therein a print substrate 130 on which the image processing section 120 and the control section 124 are configured. The print substrate 130 and the hard disk drive 50 are electrically connected by a flexible substrate 132 (wiring member) passing through a through hole formed to the shorter side walls 1206 and 1406. Note here that a sealing member 134 seals, to be liquid tight, the space between the through hole formed to the shorter side wall 1206 and the wiring member 132.

Described next is the operation of the electronic device 100.

Exemplified first is a case where an impact force is applied to the hard disk drive 50 in the length direction.

As shown in FIG. 2A, in the state that the in-between case 14 and the case 52 are biased toward their neutral positions by the coil springs 28 and 30, respectively, the area of the aperture portion of an iris diaphragm formed between one iris section 22 and its corresponding hole 26, i.e., the cross sectional area of a flow path for the liquid L, takes a maximum value.

In this state, when an impact force is applied in the length direction because the cabinet 10 of the electronic device 100 bumps into an object, the in-between case 14 and the case 52 both move in the length direction, as shown in FIG. 2B, and the coil spring 28 located in one length direction is compressed, while the coil spring 28 located in the other length direction is extended.

In response to the movement of the in-between case 14 and the case 52, the liquid L resting in a space, i.e., between one of the shorter side walls 1406 of the in-between case 14 and the opposite shorter side wall 1206 of the outer case 12, flows into the chamber 24 after passing through the flow path formed between the outer surfaces of the iris sections 22 and the inner surfaces of the holes 26. At the same time, the liquid L in the chamber 24 passes through the holes 26 of the other shorter side wall 1406 of the in-between case 14, and then flows out to a space, i.e., between the other shorter side wall 1406 of the in-between case 14 and the opposite shorter side wall 1206 of the outer case 12.

At this time, when the liquid L passes through the flow path formed between the outer surfaces of the iris sections 22 and the inner surfaces of the holes 26, the flow path resistance is caused.

In response to the movement of the in-between case 14 and the case 52 in the length direction, the space is reduced gradually between the outer surfaces of the iris sections 22 formed to one of the shorter side walls 1406 of the in-between case 14 and the inner surfaces of the holes 26 formed to one of the shorter side walls 1206 of the outer case 12. As such, the cross sectional area of the flow path is reduced so that the flow path resistance is accordingly increased.

As such, the larger the movement amount of the in-between case 14 and the case 52, the more the cross sectional area of the flow path is reduced. As a result, the flow path resistance is accordingly increased so that the impact force can be favorably reduced.

Note here that the impact force is partially reduced also when the coil spring 28 is compressed or extended.

After the impact force is reduced as such, the in-between case 14 and the case 52 are put back to the neutral positions of FIG. 2A by the biasing force of the coil spring 28.

If with the impact force in the width direction, the above operation is applicable.

In this embodiment, the in-between case 14 moves together with the case 52 in the length and width directions, and the iris sections 22 form an iris diaphragm together with a portion of the case 52 via the in-between case 14 to reduce the cross sectional area of the flow path.

Described next is a case where an impact force is applied in the thickness direction of the hard disk drive 50.

As shown in FIG. 3A, in the state that the in-between case 14 and the case 52 are biased toward their neutral positions by the coil springs 28 and 30, respectively, the area of the aperture portion of an iris diaphragm formed between the surface of the case 52 and the holes 26, i.e., the cross sectional area of a flow path for the liquid L, takes a maximum value.

In this state, considered is an exemplary case that an impact force is applied in the thickness direction (downward) because the cabinet 10 of the electronic device 100 bumps into an object. In this case, as shown in FIG. 3B, the in-between case 14 does not move in the thickness direction but only the case 52 moves in the thickness direction. The coil spring 30 located in one thickness direction is compressed, and the coil spring 30 located in the other thickness direction is extended.

In response to the movement of the case 52, the liquid L resting in a space between the bottom surface of the case 52 and the bottom wall 1402 of the in-between case 14 flows out from the chamber 24 after passing through the holes 26.

At the same time, the liquid L outside of the chamber 24 passes through the holes 26, and then flows into a space between the upper surface of the case 52 and the upper wall 1408 of the in-between case 14.

At this time, when the liquid L passes through the flow path formed by the inner surfaces of the holes 26, the flow path resistance is caused.

In response to the movement of the case 52, a portion of the lower surface of the case 52 comes above the holes 26, the cross sectional area is decreased for an inlet of the flow path formed by the inner surfaces of the holes 26, and the flow path resistance is increased.

As the case 52 moves, the cross sectional area of the inlet of the flow path is reduced by degrees and the flow path resistance is accordingly increased so that the impact force can be favorably reduced.

As such, the larger the movement amount of the case 52, the more the cross sectional area of the flow path being the iris diaphragm is reduced. As a result, the flow path resistance is accordingly increased so that the impact force can be favorably reduced.

Note here that the impact force is partially reduced also when the coil spring 30 is compressed or extended.

After the impact force is reduced as such, the in-between case 14 and the case 52 are put back to the neutral positions of FIG. 3A by the biasing force of the coil spring 30.

Herein, if the impact force acting on the case 52 is directed in a combination direction of at least two of the directions of length, width, and thickness, the cross sectional areas of the flow paths are each reduced depending on in which direction the in-between case 14 and the case 52 are moved. This thus favorably leads to the reduction of an impact force in the combination direction of at least two of the directions of length, width, and thickness.

According to this embodiment, the flow path shows a change of the cross sectional area depending on the magnitude of an impact force. This accordingly varies the magnitude of the flow path resistance, and this is considered advantageous to reduce, to a sufficient degree, the impact force irrespective of its magnitude More in detail, the impulse to be generated to the hard disk drive 50 by an impact applied to the cabinet 10 of the electronic device 100 is indicated by Ft, where F denotes a force to be applied to the hard disk 50, and t denotes a time for the application duration of the force F.

Accordingly, the larger the flow path resistance becomes as a result of the reduction of the cross sectional area of the iris flow path, the longer the time t will be for application of the force F. That is, if with the same impulse, the longer time t will reduce the force F so that the force to be applied to the hard disk drive 50, i.e., impact force, can be reduced more effectively.

What is more, there is no need to set specific gravities of two types of liquid and the hard disk drive in such a manner that the hard disk drive floats between the two types of liquid having specific gravities different from each other as in the previous technology. This is considered advantageous in terms of design flexibility.

The iris configuration does not necessarily include an in-between case as does in this embodiment, and various other previously-known iris configurations are applicable to the iris configuration in this embodiment, i.e., forming, when the case comes close to the chamber wall surface, a flow path together with a portion of the case to let escape the liquid resting at a portion of the sealed space sandwiched between the case and the chamber wall surface to any other portion of the sealed space, and reducing the cross sectional area of the flow path as the case comes close to the chamber wall surface.

Exemplified in the embodiment is the case that the electronic unit is the hard disk drive 50. Alternatively, the electronic unit may be a disk drive that performs information recording and/or reading to/from disk-shaped recoding media, e.g., magnetic disks, optical disks, and magneto-optical disks. The electronic unit is surely not restrictive to a disk drive, and is applicable to various other types of unit.

Exemplified in the embodiment is the case that the electronic device is an imaging device. The electronic device of the invention is surely not restrictive thereto, and may be a music player, a notebook personal computer, a recording device, or others.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic device, comprising:
   a chamber having a chamber wall surface defining a liquid-tight sealed space;
   an electronic unit housed in a liquid-tight case, the case being disposed in the chamber to define an intermediate space between the case and the chamber wall surface;
   a biasing unit in the chamber that biases the case toward a predetermined neutral position in the intermediate space;
   a liquid disposed in the intermediate space; and
   an iris system formed in the chamber such that, when the case moves toward a portion of the chamber wall surface, the iris system cooperates with the case to define a flow path through which the liquid in a portion of the intermediate space between the case and the portion of the chamber wall surface flows to another portion of the intermediate space, a cross-sectional area of the flow path decreasing as the case moves closer to the portion of the chamber wall surface.

2. The electronic device according to claim 1, wherein
   the case has a rectangular shape extending in a thickness direction, a width direction, and a length direction, and
   the iris system includes an iris section opposite each surface of the case in the thickness, the width, and length directions.

3. The electronic device according to claim 2, further comprising:
   an intermediate case disposed in the chamber so that the intermediate space is defined between the chamber wall surface and the intermediate case, the intermediate case being disposed in the chamber so as to be immovable in the thickness direction and movable in the width and length directions, wherein
   the case of the electronic unit is disposed in the intermediate case so as to be movable in the thickness direction and immovable in the width and length directions,
   the biasing unit biases the case of the electronic unit in the intermediate case toward the neutral position in the thickness direction, and biases the intermediate case in the chamber to bring the case of the electronic unit toward the neutral position in the width and length directions, and
   the iris sections are provided in the chamber opposite each surface of the intermediate case in the thickness, width and length directions, and in the intermediate case opposite each surface of the case of the electronic unit in the thickness, width and length directions.

4. The electronic device according to claim 3, wherein the iris sections each include a plurality of convex portions protruding from portions of the chamber wall surface opposite the surfaces of the intermediate case in the width and length directions, and apertures formed in the surfaces of the intermediate case at positions opposed to the convex portions, whereby when the convex portions and the apertures are brought close to each other by movement of the intermediate case in the width and length directions from the neutral position, the flow path is defined by outer surfaces of the convex portions and inner surfaces of the apertures, and the cross-sectional area of the flow path decreases as the convex portions move toward the apertures, and when the case of the electronic unit moves in the thickness direction from the neutral position, the case of the electronic unit occludes at least some of the apertures, thereby reducing the cross-sectional area of the flow path.

5. The electronic device according to claim 4, wherein the convex portions are each formed in the shape of a truncated cone, and the inner surfaces of the apertures are coaxial with the convex portions in the neutral position, the inner surface of each of the apertures having a conical surface of a size sufficient to receive therein the corresponding convex portion.

6. The electronic device according to claim 1, further comprising:

a flexible substrate electrically connected to the electronic unit, the flexible substrate protruding from the case of the electronic unit and extending to an outside of the chamber through a liquid-tight seal in the chamber wall surface.

7. The electronic device according to claim 1, wherein the liquid is water or silicon oil.

8. The electronic device according to claim 1, wherein the electronic unit is a disk drive for recording and/or reproduction of information.

* * * * *